April 14, 1931.  G. W. CLAPP  1,800,714
INTERALVEOLAR ANGLE FINDER
Filed Sept. 27, 1928
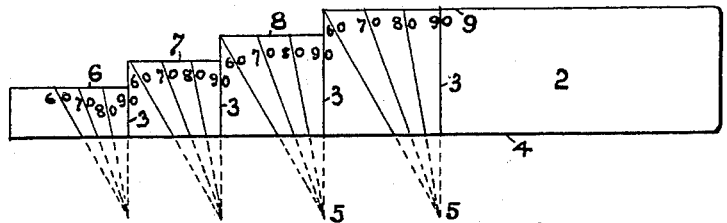
FIG.1
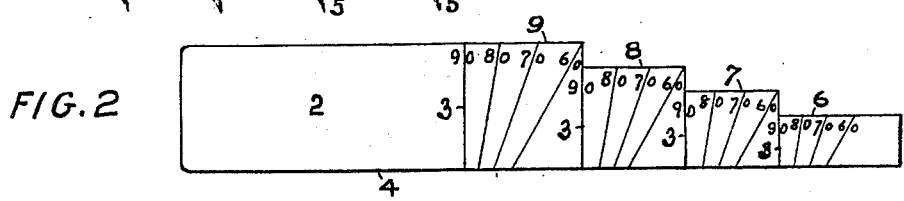
FIG.2
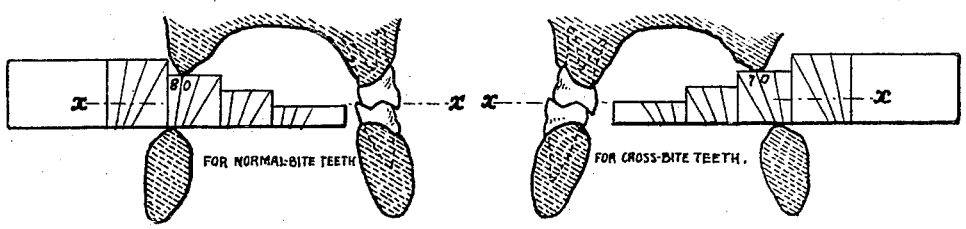
FIG.3  FIG.4
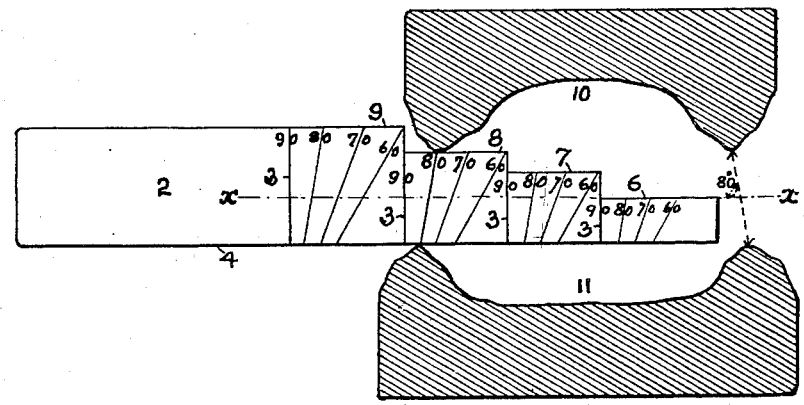
FIG.5
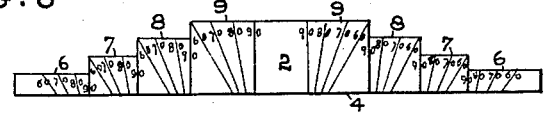
FIG.6
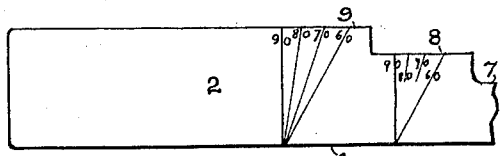
FIG.7
Inventor
George Wood Clapp.
By
Attorney.

Patented Apr. 14, 1931

1,800,714

UNITED STATES PATENT OFFICE

GEORGE WOOD CLAPP, OF NEW ROCHELLE, NEW YORK, ASSIGNOR TO THE DENTISTS' SUPPLY COMPANY OF NEW YORK, A CORPORATION OF NEW YORK

INTERALVEOLAR ANGLE FINDER

Application filed September 27, 1928. Serial No. 308,708.

The object of my invention is to provide a guide or scale adapted for use by dentists, in connection with patients for whom artificial dentures are to be made, to determine whether or not the dentures may be made with artificial bicuspids and molars of "normal-bite" forms or whether the "bite" of the patient would necessitate the use in the denture of "cross-bite" forms, namely, forms adapted to jaws in which the mandible is materially broader than the maxilla, measured horizontally across the interalveolar crest lines. My improved guide or scale is intended to measure the angle of a line drawn from the crest of the upper edentulous ridge to the crest of the lower edentulous ridge, in relation to the hypothetical occlusal plane assumed for the natural teeth and what would be the occlusal plane for the artificial dentures, to suit the requirements of the patient.

It is known that following the loss of natural teeth, the mandible approaches the maxilla more closely and shortens the "bite" as compared with the "bite" when all the natural teeth are in position. In securing the proper "bite" with the artificial dentures (it rarely being practical to restore the original height of the "bite"), this variation in the height of the "bite," coupled with the changes in the alveolar ridges due to the resorption of the bony tissue, tends to decrease the angle formed by a line between the maxilla and mandible crests and the hypothetical occlusal plane in the conditions assumed for proper use of the dentures designed for them. These natural changes which occur, following the removal of the natural teeth, have a tendency to require the use of unnatural forms of artificial teeth and leaning to the use of what has been above referred to as "cross-bite" teeth.

From the foregoing statements, it will be understood that my improved scale and angle finder for the alveolar crests is intended to determine the angle in connection with a predetermined extent of the height of the "bite" to be provided for in the dentures, measured along the interalveolar crest line, and to this end my improved scale repeats the series of angularly arranged lines and providing with each repeat a different height corresponding to the various "bites" to be provided for in the scale. Moreover, it is pointed out that with any given angle of the interalveolar crests, the "cross-bite" requirements of the teeth would increase for shorter "bites" as compared to greater heights of "bite".

In substance, the foregoing may be more concisely stated by saying that when the angle, which the interalveolar crest line forms with and above the hypothetical occlusal plane, is 80° or thereabouts, successful artificial dentures may be formed by the use of what are called "normal-bite" bicuspids and molars; but when the angle which the interalveolar crest line forms with and above the occlusal plane is less than 80° or thereabouts, the desirability of using "cross-bite" teeth is indicated, and when this angle is much less than 80°, the use of "cross-bite" teeth may be considered as essential to the most satisfactory results to be obtained from the artificial dentures.

With the above and other objects in view, the nature of which will be more fully understood from the description hereinafter, the invention consists in the novel construction of interalveolar angle finder, as hereinafter more fully described and defined in the claims.

Referring to the drawings: Fig. 1 is a view of my improved interalveolar angle finder showing one face thereof; Fig. 2 is a similar view showing the other face thereof; Figs. 3 and 4 are diagrammatic illustrations elucidating the principle of my improvement where the angle is 80°, in the one case, and 70° in the other case; Fig. 5 is a vertical section through plaster models of the upper and lower jaw portions, showing the alveolar ridges thereof and with my improved interalveolar angle finder applied for a "bite" of medium height; and Figs. 6 and 7 illustrate modified forms of my improved interalveolar angle finder.

My improved interalveolar angle finder comprises a body portion 2 formed of a sheet of cardboard, celluloid, metal or any other substance, conveniently made in sheet form, and having thereon at one end a plurality of radiating lines 3 arranged in sets, each set approximately four in number and one of the lines being at right angles to a longitudinal edge 4 of the body portion 2, while the remainder of the radial lines 3 are drawn at different angles to said longitudinal edge 4 and shown by way of example, such as will make angles of 60°, 70° and 80°, respectively, with said edge. Moreover, it is assumed that said radiating lines 3 in each set start from a common center 5, as is indicated in dotted lines, and further, that the centers for the lines of each set are similarly positioned below the edge 4, whereby the arrangement of the lines in respect to each set are exactly alike as to angles. Where the lines 3 radiate from the center 5 below the lower edge of the device, the angular lines of each set are separated from each other and, therefore, are more readily positioned in ascertaining the interalveolar angle, but broadly considered, the same result would be had if all of said lines radiated from a point coincident with the bottom edge of the body and the 90° line thereof, as more fully illustrated in Fig. 7.

The body part 2 is furthermore stamped out in stepped form, as indicated at 6, 7, 8 and 9, there being a different height of step for each set of radial lines 3, and the height of these steps represent the heights of the respective "bites" which are predetermined to be the proper "bite" for the interalveolar angle to be found for the models of the patients' jaws and which is to be the guide in the selection of the bicuspid and molar teeth to be employed in dentures.

I have described the radiating lines and other characteristics upon one face of the angle finder, as in Fig. 1. The arrangement of the lines and, of course, the shape of the body is the same on the other face, but in this instance the degree numbers will read from left to right, beginning with the vertical or right angles lines, whereas, in the first instance, the left hand writing would begin with the line having the lowest degree marked thereon and from left to right to the highest degree indicating the vertical line. Furthermore, as shown in Fig. 1, the radiating lines of each set incline from the vertical line in a left hand direction, whereas, on the other face, this inclination of the lines is in a right hand direction.

In Fig. 5, I have shown two plaster models 10 and 11 made from the patient and respectively representing the maxilla and mandibular alveolar ridges, and with respect to which the upper and lower dentures are to conform. These models are ordinarily secured in an articulator (not shown) and the vulcanite plates and artificial teeth built up thereon in the usual manner. However, in the building up of such dentures, it is necessary to determine the character of the bicuspids and molars to be employed, and it is at this juncture that the importance of my improved interalveolar angle finder comes into play.

Assuming that the height of the "bite" required by the patient would be equivalent to the next to highest step in the angle finder, the articulator is set for adjusting the models 10 and 11 apart, to suit such height of "bite". When this is done, the interalveolar angle finder is thrust between the models, as indicated in Fig. 5, and it will then be seen that the inclined line 80 at the bottom, being adjusted upon the alveolar ridge of the model 11, the upper end of said inclined line 80 will approximate the alveolar ridge of the upper model 10 which corresponds to the upper jaw. The interalveolar angle is, therefore, shown to be 80° to the horizontal or hypothetical occlusal plane, indicated in dotted lines $x$—$x$ of Fig. 5. With this angle, the denture may be made up with "normal-bite" bicuspids and molars, as in Fig. 3 (right-hand portion). On the other hand, had the interalveolar angle, shown in Fig. 5, been 70° or less to the occlusal plane or horizontal and as indicated in Fig. 4, then the indication as to the denture requirements would dictate the use of "cross-bite" bicuspids and molars, (as indicated at the left hand side of this figure). By the use of "cross-bite" teeth, where the interalveolar angle is materially less than 80°, the dentures when completed will be stable in position, efficient in mastication, and comfortable in use, to a degree which cannot be secured with normal forms of teeth.

With the foregoing explanations, it will be apparent that my interalveolar angle finder is a device to assist the dentist in accurately and speedily determining whether he should use "normal-bite" or "cross-bite" teeth, and also to enable him to determine with comparative accuracy what the interalveolar angle actually is, so that the particular form, setting or possible modification of the "cross-bite" teeth may be assured.

In using the angle finder, it is first placed between the alveolar ridges of the two models for one side of the jaw, to determine the angle for that side of the denture, and then reversed and adjusted from the other side to determine whether the interalveolar angle on that side corresponds to the one first determined, and if not, to ascertain to what extent it differs whereby the proper selection of "cross-bite" teeth may be made or provided in the denture to secure the desired results. This will obviate to a large measure all experimental testing and substitutions, inasmuch as the "cross-bite" teeth structures are definite commercial products and may readily be selected once the "bite" and interalveolar angle is determined.

Instead of printing or marking the angular lines 3 upon opposite sides of the stepped body 2, as shown in Figs. 1 and 2, the device may be made as indicated in Fig. 6, wherein the body is stepped in opposite directions and all of the markings are upon one face.

It will be understood that the vertical and angular lines shown in Figs. 1 or 2 may be printed on one side of the sheet like body only, and the same may be inserted from the right or left side between the jaws of the patient by simply reversing the device; but to facilitate reading the interalveolar angle from the reverse face, the body sheet may be made of transparent celluloid. Furthermore, the continuity or formation of the lines may be made in any suitable manner, so long as they may be followed across the body. The real important feature of the markings is to definitely locate the termination of the interalveolar angle indications along the upper and lower edges of the body sheet whereby the corresponding indications can be respectively positioned upon the alveolar ridges of the maxilla and mandible.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details as the same are susceptible of modification in various particulars, without departing from the spirit or scope of the invention.

Having now described my invention, what I claim and desire to secure by Letters Patent is:

1. An interalveolar angle finder, which consists of a sheet-like body having stepped portions along its length, each stepped portion having formed thereon a similar set of diverging lines having angular indications thereon showing the angles which said lines make with a horizontally alined indication upon the sheet-like body.

2. An interalveolar angle finder, which consists of a sheet-like body having one longitudinal edge made straight and the other edge formed with stepped portions along its length, each stepped portion provided with a substantially similar set of markings designating a plurality of angles in relation to to the continuous longitudinal edge of the sheet-like body and wherein further, the opposite faces of the stepped portions are similarly marked.

3. The invention according to claim 1, wherein further, the stepped portions of the body successively increase in vertical dimensions when the sheet-like body is held in a vertical plane with its length horizontal and with the inclinations of the angularly diverging lines all leaning to the same side of a vertical line.

4. The invention according to claim 1, wherein further, the diverging lines on the same face of each stepped portion are similarly inclined to a vertical line so that they all lean in the same direction with respect to said vertical line, and wherein also the opposite face of each of the stepped portions is similarly marked with corresponding diverging lines.

5. An interalveolar angle finder, which consists of a relatively long body having stepped portions of different widths transversely to the length of the body and each of the stepped portions having a set of markings indicating a plurality of angular inclinations and said markings also having associated therewith angle indications.

In testimony of which invention, I hereunto set my hand.

GEORGE WOOD CLAPP.